US012801865B2

(12) United States Patent
Chen

(10) Patent No.: US 12,801,865 B2
(45) Date of Patent: Nov. 17, 2026

(54) LARGE MODEL-BASED METHOD OF GENERATING SAMPLE, METHOD OF TRAINING MODEL, RANKING METHOD, AND DEVICE

(71) Applicant: BEIJING BAIDU NETCOM SCIENCE TECHNOLOGY CO., LTD., Beijing (CN)

(72) Inventor: Yushen Chen, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 154 days.

(21) Appl. No.: 18/888,820

(22) Filed: Sep. 18, 2024

(65) Prior Publication Data

US 2025/0384218 A1 Dec. 18, 2025

(30) Foreign Application Priority Data

Jun. 13, 2024 (CN) ......................... 202410764100.5

(51) Int. Cl.
*G06F 40/40* (2020.01)
*G06F 40/279* (2020.01)
(Continued)

(52) U.S. Cl.
CPC ............ *G06F 40/40* (2020.01); *G06F 40/279* (2020.01); *G06F 40/30* (2020.01); *G06N 20/00* (2019.01); *G06Q 10/067* (2013.01)

(58) Field of Classification Search
CPC ......... G06F 40/40; G06F 40/30; G06F 40/279
See application file for complete search history.

(56) References Cited

U.S. PATENT DOCUMENTS

2021/0311979 A1* 10/2021 Yu ......................... G06F 16/313

FOREIGN PATENT DOCUMENTS

CN 116401382 7/2023
CN 117540703 2/2024
(Continued)

OTHER PUBLICATIONS

Ivanov, O., & Kobets, V. (Sep. 2023). Data analysis for predicting stock prices using financial indicators based on business reports. In International Conference on Information and Communication Technologies in Education, Research, and Industrial Applications (pp. 227-239). (Year: 2023).*
(Continued)

*Primary Examiner* — Ibrahim Siddo
(74) *Attorney, Agent, or Firm* — Pillsbury Winthrop Shaw Pittman, LLP

(57) ABSTRACT

A large model-based method of generating a sample, a method of training a model, a ranking method, and a device are provided, which relate to a field of artificial intelligence technology, and in particular to fields of intelligent search, deep learning, natural language processing and large model technologies. The method includes: determining indicators from initial indicators contained in an indicator database in response to a sample generation request, where the sample generation request contains an example sample; generating candidate questions based on the indicators by using a question example contained in the example sample as a basic corpus; recalling candidate indicators corresponding to each candidate question from the initial indicators; and generating target samples based on the candidate questions and the candidate indicators corresponding to each candidate question by using example samples as the basic corpus.

18 Claims, 7 Drawing Sheets

(51) Int. Cl.

| | |
|---|---|
| ***G06F 40/30*** | (2020.01) |
| ***G06N 20/00*** | (2019.01) |
| ***G06Q 10/067*** | (2023.01) |

(56) References Cited

FOREIGN PATENT DOCUMENTS

| | | |
|---|---|---|
| CN | 117743543 | 3/2024 |
| CN | 118171642 | 6/2024 |

OTHER PUBLICATIONS

Office Action issued in corresponding Chinese Patent Application No. 202410764100.5, dated Aug. 19, 2026.

M. Bingqi et al., "A LLMs-based method for threat intelligence information extraction", Journal of Cybersecurity, vol. 2, No. 2, pp. 36-46 (Apr. 2024).

Z. Dai et al., "Promptagator: Few-Shot Dense Retrieval From 8 Examples", arXiv: 2209.11755v1 at arxiv.org (accessed Sep. 10, 2026), pp. 1-21 (2022).

* cited by examiner

LARGE MODEL-BASED METHOD OF GENERATING SAMPLE, METHOD OF TRAINING MODEL, RANKING METHOD, AND DEVICE

This application claims the benefit of Chinese Patent Application No. 202410764100.5 filed on Jun. 13, 2024, the whole disclosure of which is incorporated herein by reference.

TECHNICAL FIELD

The present disclosure relates to a field of artificial intelligence technology, and in particular to fields of intelligent search, deep learning, natural language processing and large model technologies. More specifically, the present disclosure relates to a large model-based method of generating a sample, a method of training a model, a ranking method, and a device.

BACKGROUND

Large language model (LLM) is a deep learning model that is trained based on massive text data. It may not only generate natural language text, but also deeply understand text meaning and process various natural language tasks such as text summarization, question answering, translation, etc.

SUMMARY

The present disclosure provides a large model-based method of generating a sample, a method of training a model, a ranking method, and a device.

According to an aspect of the present disclosure, a large model-based method of generating a sample is provided, including: determining a plurality of indicators from a plurality of initial indicators contained in an indicator database in response to a sample generation request, where the sample generation request contains an example sample; generating a plurality of candidate questions based on the plurality of indicators by using a question example contained in the example sample as a basic corpus; recalling a plurality of candidate indicators corresponding to each candidate question from the plurality of initial indicators; and generating a plurality of target samples based on the plurality of candidate questions and the plurality of candidate indicators corresponding to each candidate question by using a plurality of example samples as the basic corpus.

According to an aspect of the present disclosure, a method of training a model is provided, including: acquiring an initial sample set including a plurality of example samples; generating a plurality of target samples based on the example samples; and training an initial model by using the plurality of example samples and the plurality of target samples corresponding to the example samples, so as to obtain a ranking model; where the plurality of target samples corresponding to the example samples are generated based on the example samples by using the large model-based method of generating the sample as described above.

According to an aspect of the present disclosure, a ranking method is provided, including: acquiring a target question and a plurality of recall indicators; inputting the target question and the plurality of recall indicators into a ranking model to obtain respective correlation scores between the target question and the plurality of recall indicators; and ranking the plurality of recall indicators based on the respective correlation scores between the target question and the plurality of recall indicators; where the ranking model is trained by using the method of training the model as described above.

According to another aspect of the present disclosure, an electronic device is provided, including: at least one processor; and a memory communicatively connected to the at least one processor, where the memory stores instructions executable by the at least one processor, and the instructions are configured to, when executed by the at least one processor, cause the at least one processor to implement the methods described above.

According to another aspect of the present disclosure, a non-transitory computer-readable storage medium having computer instructions therein is provided, where the computer instructions are configured to cause a computer to implement the methods described above.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure. In the accompanying drawings.

DETAILED DESCRIPTION OF EMBODIMENTS

Exemplary embodiments of the present disclosure will be described below with reference to the accompanying drawings, which include various details of embodiments of the present disclosure to facilitate understanding and should be considered as just exemplary. Therefore, those ordinary skilled in the art should realize that various changes and modifications may be made to embodiments described herein without departing from the scope and spirit of the present disclosure. Likewise, for clarity and conciseness, descriptions of well-known functions and structures are omitted in the following description.

An application process of a large language model may include a supervised fine-tuning stage, in which the large language model may perform supervised learning on labeled data for a specific task and a model parameter may be adjusted to adapt to the specific task. The specific task may be, for example, a retrieval task in a data analysis industry. In the data analysis industry such as finance and market research, it is often needed to retrieve related indicator data from a large database, and a large language model fine-tuned for the task may be applied to effectively retrieve the most related indicator data from massive indicator data. However, with a development of business, the amount of indicator data in the large database may continue to increase, and the fine-tuning of the large language model also requires more labeled data. If the fine-tuning of the large language model relies on manual sample labeling of business experts, there are problems such as high labor and time costs, low labeling efficiency, etc., which may not meet the needs of business development.

In view of this, embodiments of the present disclosure provide a large model-based method and apparatus of generating a sample, a method and apparatus of training a model, a ranking method and apparatus, and a device. The large model-based method of generating the sample includes: determining a plurality of indicators from a plurality of initial indicators contained in an indicator database in response to a sample generation request, where the sample generation request contains an example sample; generating a plurality of candidate questions based on the plurality of indicators by using a question example contained in the example sample as a basic corpus; recalling a plurality of candidate indicators corresponding to each candidate question from the plurality of initial indicators; and generating a plurality of target samples based on the plurality of candidate questions and the plurality of candidate indicators corresponding to each candidate question by using a plurality of example samples as the basic corpus.

Figure 1:
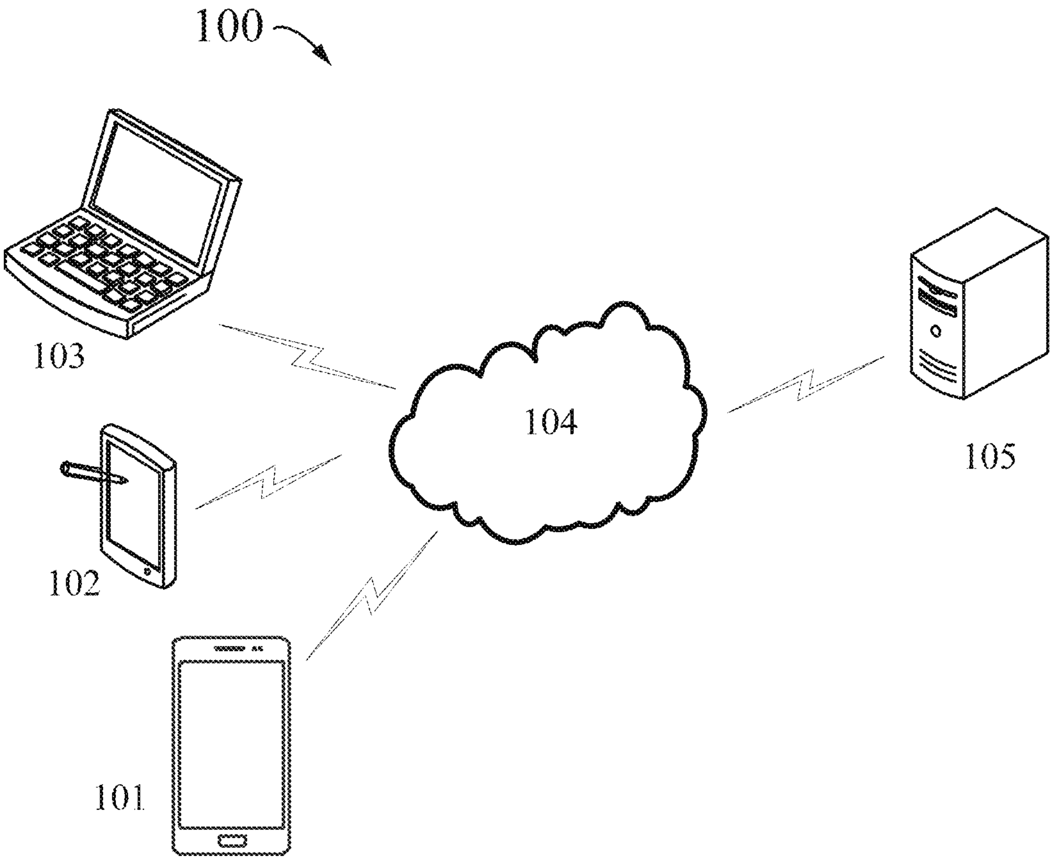
FIG. 1 schematically shows an exemplary system architecture to which methods and apparatuses of embodiments of the present disclosure may be applied according to embodiments of the present disclosure.

FIG. 1 schematically shows an exemplary system architecture to which methods and apparatuses of embodiments of the present disclosure may be applied according to embodiments of the present disclosure.

It should be noted that FIG. 1 is only an example of the system architecture to which embodiments of the present disclosure may be applied, so as to help those skilled in the art understand technical contents of the present disclosure. However, it does not mean that embodiments of the present disclosure may not be applied to other devices, systems, environments or scenarios. For example, in other embodiments, the exemplary system architecture to which the large model-based method and apparatus of generating the sample may be applied may include a terminal device, but the terminal device may implement the large model-based method and apparatus of generating the sample without interacting with a server.

As shown in FIG. 1, a system architecture 100 according to such embodiments may include terminal devices 101, 102 and 103, a network 104, and a server 105. The network 104 is a medium for providing a communication link between the terminal devices 101, 102, 103 and the server 105. The network 104 may include various connection types, such as wired and/or wireless communication links, etc.

The terminal devices 101, 102 and 103 may be used by a user to interact with the server 105 through the network 104 to receive or send messages, etc. The terminal devices 101, 102 and 103 may be installed with various communication client applications, such as knowledge reading applications, web browser applications, search applications, instant messaging tools, email clients and/or social platform software, etc. (only for example).

The terminal devices 101, 102 and 103 may be various electronic devices having display screens and supporting web browsing, including but not limited to smart phones, tablet computers, laptop computers, and desktop computers, etc.

The server 105 may be a server providing various services, such as a background management server (only for example) that provides a support for content browsed by the user using the terminal devices 101, 102 and 103. The background management server may analyze and process received data such as a user request, and feed back a processing result (such as a web page, an information, or data acquired or generated according to the user request) to the terminal devices.

It should be noted that the methods in embodiments of the present disclosure may generally be performed by the terminal device 101, 102 or 103. Accordingly, the apparatuses in embodiments of the present disclosure may be generally arranged in the terminal device 101, 102 or 103.

Alternatively, the methods in embodiments of the present disclosure may generally be performed by the server 105. Accordingly, the apparatuses in embodiments of the present disclosure may be generally arranged in the server 105. The methods in embodiments of the present disclosure may also be performed by a server or server cluster different from the server 105 and capable of communicating with the terminal devices 101, 102, 103 and/or the server 105. Accordingly, the apparatuses in embodiments of the present disclosure may also be arranged in a server or server cluster different from the server 105 and capable of communicating with the terminal devices 101, 102, 103 and/or the server 105.

It should be understood that the number of terminal devices, network and server shown in FIG. 1 are only schematic. According to implementation needs, any number of terminal devices, networks and servers may be provided.

In technical solutions of the present disclosure, a collection, a storage, a use, a processing, a transmission, a provision, a disclosure, an application and other processing of user personal information involved comply with provisions of relevant laws and regulations, take necessary security measures, and do not violate public order and good custom.

In the technical solutions of the present disclosure, the acquisition or collection of user personal information has been authorized or allowed by users.

Figure 2:
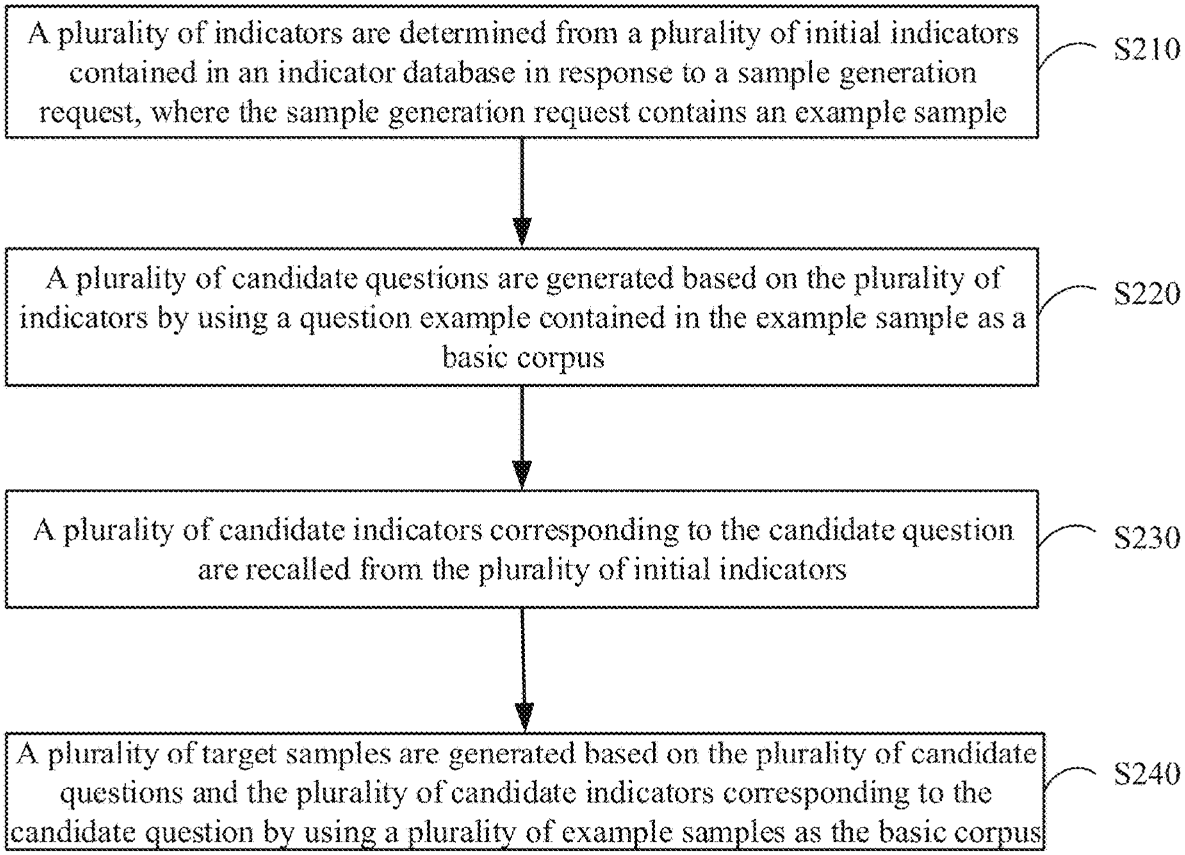
FIG. 2 schematically shows a flowchart of a large model-based method of generating a sample according to embodiments of the present disclosure.

FIG. 2 schematically shows a flowchart of a large model-based method of generating a sample according to embodiments of the present disclosure.

As shown in FIG. 2, the method includes operation S210 to operation S240.

In operation S210, a plurality of indicators are determined from a plurality of initial indicators contained in an indicator database in response to a sample generation request, where the sample generation request contains an example sample.

In operation S220, a plurality of candidate questions are generated based on the plurality of indicators by using a question example contained in the example sample as a basic corpus.

In operation S230, a plurality of candidate indicators corresponding to the candidate question are recalled from the plurality of initial indicators.

In operation S240, a plurality of target samples are generated based on the plurality of candidate questions and the plurality of candidate indicators corresponding to the candidate question by using a plurality of example samples as the basic corpus.

The sample generation request may be generated when a sample generation task is executed on an electronic device, and the sample generation task may be represented as a task of generating a large number of target samples based on a small number of example samples.

The indicator database may be constructed based on a plurality of industry databases. A plurality of initial indicators may be recorded in the indicator database, and the plurality of initial indicators may be obtained by performing data cleaning and statistics on industry data contained in each industry database. Indicator data of the initial indicator may include a plurality of fields, such as an indicator identification, an indicator name, a date, an indicator value, and a vector feature, etc. In response to the sample generation request, a plurality of indicator data may be selected from the plurality of initial indicators according to a particular strategy, and respective indicator names of the selected plurality of indicator data may be used as a plurality of indicators determined from the indicator database.

The strategy used to select a plurality of indicator data from the plurality of initial indicators may include a continuous selection, a random selection, etc. based on the indicator identification. Taking the number of determined indicators being n as an example, the continuous selection based on the indicator identification may refer to determining n consecutive initial indicators, starting from a starting indicator, as the n determined indicators. The starting indicator may be a first initial indicator in the indicator database or any one of the plurality of initial indicators, which is not limited here. The random selection may refer to randomly selecting n initial indicators from the plurality of initial indicators as the n determined indicators. Optionally, in a sample generation task, it is possible to select a plurality of indicator sets for the generation of target samples. For example, it is possible to select m indicator sets through continuous selection or random selection based on the indicator identification. Different indicator sets may be selected by different methods, and each indicator set may include n indicators determined by selection.

Each example sample may include a question example, a plurality of candidate indicator examples, one or more target indicator examples, and a label. The question example may refer to a question text to be input into the large language model, the plurality of candidate indicator examples may refer to a plurality of indicators output by the large language model based on the question example, the one or more target indicator examples may refer to indicator(s) selected from the plurality of indicators and output by the large language model based on the question example, and the label may indicate whether the one or more target indicator examples are the indicators that need to be selected, that is, a degree of user recognition for the target indicator examples. For example, if the label is 1, it indicates that the target indicator example is recognized by the user, that is, the example sample is a positive sample. If the label is 0, it indicates that the target indicator example is not recognized by the user, that is, the example sample is a negative sample. Optionally, the example samples contained in the sample generation request may all be positive samples. For example, the question example in the example sample may be expressed as "what is a relationship between a purchase price of material A and a purchase price of material B"; the plurality of candidate indicator examples in the example sample may include "a current value of a purchase price indicator of material A", "a current value of a purchase price indicator of material B", "a current value of a sales volume of material A", "a month-on-month ratio of a factory price indicator of material A", etc.; the one or more target indicator examples may include "a current value of a purchase price indicator of material A" and "a current value of a purchase price indicator of material B."

Optionally, the example sample may be edited by a business expert, or the example sample may be generated by mining historical data, for example, the example sample may be generated based on a question queried by a user, a feedback indicator for the question fed back by an electronic device and an indicator actually selected by the user in a historical business process.

By using the large language model, a grammar template may be extracted based on the question example, and a certain number of indicators may be randomly selected from the plurality of indicators and filled into the grammar template to generate a candidate question. For example, the question example may be expressed as "what is a relationship between a purchase price of material A and a purchase price of material B", the grammar template extracted based on the question example may be "what is a relationship between XX and XX", the plurality of indicators may include "a current value of a total output value of region C", "a current value of a factory price indicator of material D", and "a month-on-month ratio of a factory price indicator of material D." Accordingly, the candidate questions generated based on the grammar template and the plurality of indicators may include "what is a relationship between a current value of a total output value of region C and a current value of a factory price indicator of material D", "what is a difference between a current value of a total output value of region C and a month-on-month ratio of a factory price indicator of material D", "what is a difference between a current value of a factory price indicator of material D and a month-on-month ratio of a factory price indicator of material D", etc.

The indicator database may contain a plurality of initial indicators that are similar to each other in terms of literal expression or semantics, that is, the number of initial indicators similar to the candidate question in the indicator database may be much larger than the number of indicators required to generate the candidate question. Therefore, it is possible to recall a plurality of candidate indicators similar to the candidate question from the plurality of initial indicators in the indicator database based on similarity in literal expression or semantics. The method used to recall indicators is not limited here. Optionally, for each candidate question, a plurality of candidate indicators similar to the candidate question may be recalled from the plurality of initial indicator.

Similar to the example sample, the target sample may contain a candidate question, a plurality of candidate indicators corresponding to the candidate question, one of the plurality of candidate indicators, and a label. The label may be determined based on whether that candidate indicator is a target indicator. For example, if that candidate indicator is the target indicator, a value of the label may be determined as 1; if that candidate indicator is not the target indicator, the value of the label may be determined as 0. The example sample may contain a selection strategy information for selecting a target indicator example from the plurality of candidate indicator examples. By using the large language model, it is possible to extract the selection strategy information from the plurality of example samples, and guide the selection of the target indicator for each candidate question by using the selection strategy information, so as to determine labels of a plurality of target samples related to each candidate question, thereby generating a plurality of target samples.

According to embodiments of the present disclosure, when performing a sample augmentation on a small number of example samples, a large language model may be used to: generate a large number of candidate questions by using questions in the small number of example samples as generation paradigm; for each candidate question, recall the candidate indicators matched with the candidate question; and then generate labels by labeling based on the small number of example samples to obtain target samples. By combining the large language model for sample generation and labeling, it is possible to reduce dependence on manual labeling, improve a processing efficiency of the sample generation, and reduce costs of the sample generation.

In embodiments of the present disclosure, the initial indicators recorded in the indicator database may be statistical indicators of business data in various industries. The business data in various industries may include financial data, economic data, etc. The financial data may include, for example, data collected by various financial institutions in the course of conducting business. The economic data may include economic activity data in various regions, such as a production volume, a sales volume, a factory price, a sales price and other data of a particular commodity in a region. The statistical indicator may include statistical items such as a current value, a cumulative value, a year-on-year ratio, a month-on-month ratio, a growth rate, etc., or may include statistical items obtained by combining these statistical items, such as a current year-on-year ratio, a current month-on-month ratio, a cumulative year-on-year ratio, etc.

The large model-based method of generating the sample in embodiments of the present disclosure will be further described with reference to FIG. 3 to FIG. 4, with an example that the initial indicators are various statistical indicators on economic data.

The method of constructing the indicator database is not limited here. For example, it is possible to obtain various statistical indicators about economic data from various industrial databases, so as to obtain a plurality of statistical indicators, and construct an initial indicator database based on the plurality of statistical indicators, where each statistical indicator may include four fields, namely an indicator identification, an indicator name, a date, and an indicator value. The indicator name of each statistical indicator may be vectorized using a plurality of encoding models, so as to obtain a plurality of vectorized encoding features corresponding to the indicator name. The plurality of vectorized encoding features corresponding to each indicator name may be added to the initial indicator database, so that an indicator database may be constructed, that is, each initial indicator in the indicator database may include a statistical indicator and a plurality of vectorized encoding features corresponding to the indicator name of the statistical indicator.

The plurality of encoding models may include a Chinese encoding model, an English encoding model, an encoding model in other language, a multilingual encoding model, etc., which are not limited here.

Similar to the initial indicator, the example sample on which the sample generation is performed based may also be a labeled sample for economic data. The example sample may include three fields, namely a question example for economic data, a plurality of candidate indicator examples selected from various statistical indicators about economic data, and a target indicator example. The example sample may be a positive sample. The number of example samples used for the sample generation is not limit here.

During the sample generation, it is possible to acquire a plurality of indicator lists from the indicator database using a variety of selection methods, and each indicator list may include a plurality of indicators. The variety of selection methods may include a continuous selection, a partial random selection, a random selection, and so on.

The continuous selection may refer to continuously selecting a plurality of indicator lists according to the indicator identification of the initial indicator. The initial indicators with consecutive indicator identifications in the indicator database may have similar indicator names. For example, the plurality of indicators contained in the selected indicator list may be expressed as: "production of material A1: region A2: current year-on-year ratio: month", "production of material A1: region A2: current month-on-month ratio: month", "production of material A3: region A2: cumulative value: month", "production of material A3: region A2: cumulative year-on-year ratio: month."

The partial random selection may refer to, when selecting each indicator list, randomly selecting an initial indicator from the indicator database as a starting point of the selection, and continuously selecting the indicator list based on the starting point. For example, the indicators contained in a first selected indicator list may be expressed as: "production of material A3: region A2: cumulative value: month", "production of material A3: region A2: cumulative year-on-year ratio: month"; and the indicators contained in a second selected indicator list may be expressed as: "cargo throughput of port B1: cumulative value: month", "cargo throughput of port B2: cumulative value: month."

The random selection may refer to randomly selecting each indicator list and each indicator in the indicator list from the initial indicator database. For example, a plurality of indicators contained in the selected indicator list may be expressed as: "production of material A1: region A2: current year-on-year ratio: month", "cargo throughput of port B1: cumulative value: month", "area of C1-type land: region C2: current value: month", "number of D1-type vehicles: region D2: current value: month."

Figure 3:
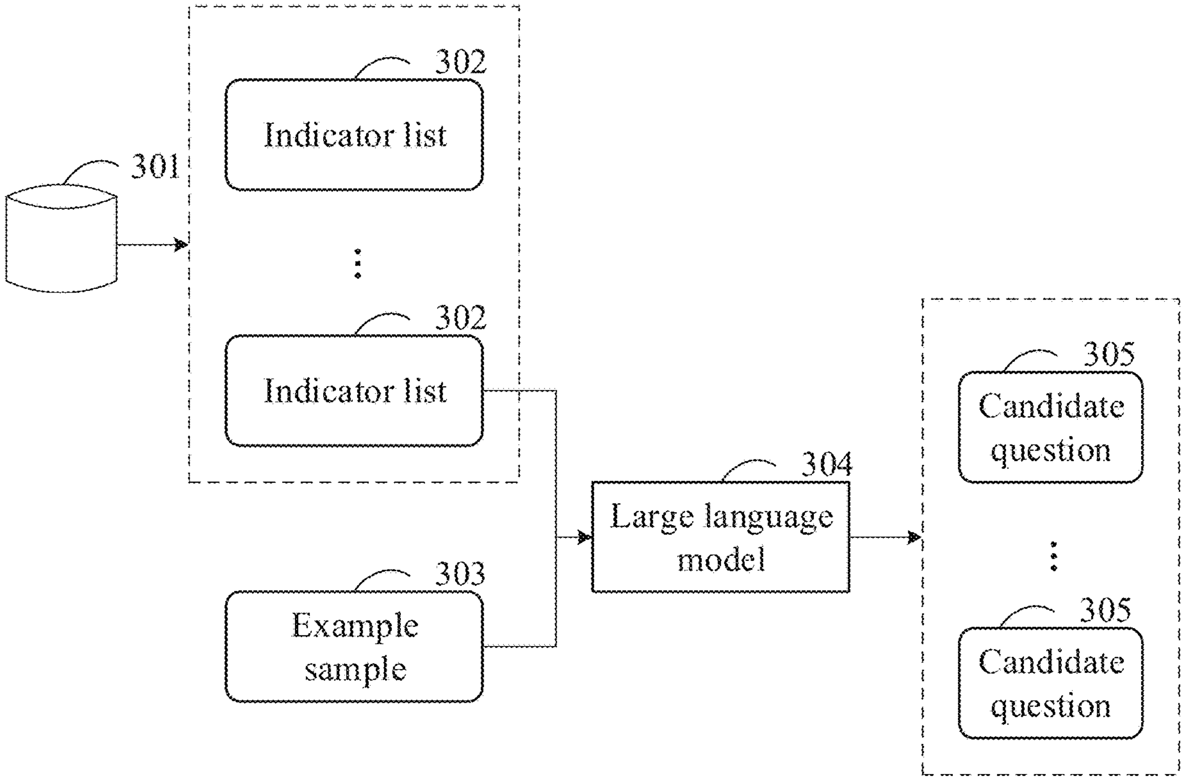
FIG. 3 schematically shows a schematic diagram of a process of imitating a question according to embodiments of the present disclosure.

FIG. 3 schematically shows a schematic diagram of a process of imitating a question according to embodiments of the present disclosure.

As shown in FIG. 3, a plurality of indicator lists 302 may be selected from an indicator database 301 through continuous selection, partial random selection, random selection, etc. Each indicator list 302 may include a plurality of indicators. For each indicator list 302, the indicator list 302 and an example sample 303 may be input into a large language model 304. The large language model 304 may refer to a style of the question example contained in the example sample 303 and imitate the question based on the plurality of indicators contained in the indicator list 302 to obtain a plurality of candidate questions 305.

According to embodiments of the present disclosure, the indicator list 302 and the example sample 303 may be processed as a prompt text, and the prompt text may be input into the large language model 304, so that the large language model 304 may imitate the question example. Optionally, the question example and the plurality of indicators may be respectively written into a second prompt template to obtain a third prompt text; the third prompt text may be input into the large language model to obtain a second output text; and a plurality of candidate questions may be extracted from the second output text.

The second prompt template may include a template field and at least one replaceable field. When filling data into the second prompt template, it is possible to replace one of the at least one replaceable field with the data to be filled in. The data to be filled in may include a question example, a plurality of indicators, and the number of candidate questions required to be generated. Each type of data to be filled in may be used to replace a replaceable field. For example, a replaceable field 1 may be replaced by the plurality of indicators, a replaceable field 2 may be replaced by the question example, and a replaceable field 3 may be replaced by the number of candidate questions required to be generated. When the data to be filled in is written into the second prompt template, the third prompt text may be obtained.

For example, the second prompt template may be expressed as: "[Question description] the following indicators are provided: Indicators. [Request] please imitate a question text: Query, please write Numbers similar question texts according to the indicators provided." Indicators may refer to the replaceable field 1, Query may refer to the replaceable field 2, and Numbers may refer to the replaceable field 3.

In the data to be filled in, the plurality of indicators may be expressed as: "purchase price indicator of material E1 (previous year=100): current value: month", "purchase price indicator of material E1 (previous year=100): cumulative value: month", "purchase price indicator of material E1 (previous year=100): current year-on-year ratio: month", "factory price indicator of product E2 (previous year=100): current value: month", "factory price indicator of product E2 (previous year=100): current year-on-year ratio: month." The question example may be expressed as "what is a relationship between a purchase price of material F1 and a purchase price of material F2", and the number of candidate questions required to be generated may be three.

The replaceable field 1 may be replaced by the plurality of indicators, which may be written to Indicators in the second prompt template; the replaceable field 2 may be replaced by the question example, which may be written to Query in the second prompt template; the replaceable field 3 may be replaced by the number of candidate questions required to be generated, which may be written to Numbers in the second prompt template. After the writing operation, the obtained third prompt text may be expressed as: "[Question description] the following indicators are provided: "purchase price indicator of material E1 (previous year=100): current value: month", "purchase price indicator of material E1 (previous year=100): cumulative value: month", "purchase price indicator of material E1 (previous year=100): current year-on-year ratio: month", "factory price indicator of product E2 (previous year=100): current value: month", "factory price indicator of product E2 (previous year=100): current year-on-year ratio: month." [Request] please imitate a question text: what is a relationship between a purchase price of material F1 and a purchase price of material F2, please write three similar question texts according to the indicators provided."

The third prompt text may be input into the large language model, and the second output text output by the large language model after processing may be expressed as: "1. what is a correlation between a purchase price indicator of material E1 and a factory price indicator of product E2? 2. what is a difference between a cumulative value and a current value of a purchase price indicator of material E1? 3. what is a relationship between a current year-on-year ratio of a purchase price indicator of material E1 and a current year-on-year ratio of a factory price indicator of product E2?" Based on the second output text, three candidate questions may be written, including: "what is a relationship between a purchase price indicator of material E1 and a factory price indicator of product E2?", "what is a difference between a cumulative value and a current value of a purchase price indicator of material E1?", and "what is a relationship between a current year-on-year ratio of a purchase price indicator of material E1 and a current year-on-year ratio of a factory price indicator of product E2?"

According to embodiments of the present disclosure, the method of extracting the candidate question from the second output text is not limited here. For example, it is possible to perform a regular extraction on the second output text to obtain the plurality of candidate questions. The regular extraction refers to processing the second output text using a regular expression to extract the plurality of candidate questions. The regular expression may be constructed, for example, using a serial number and a question mark at an end of each candidate question as markers, which will not be described in detail here. When being processed using the regular expression, the second output text may be split into a plurality of strings based on the serial number of each question, and each string may be saved separately as a candidate question.

According to embodiments of the present disclosure, by generating the candidate question using the large language model based on the example samples provided by business experts, it is possible to improve a data breadth of the generated question while ensuring professionalism of the generated candidate question, so as to meet both the need of professionalism and the need of individualization of the question.

Optionally, the question contained in the second output text may include a question not in line with natural semantics or human linguistic expressions, which is a low-quality question. As an optional embodiment, the low-quality question may be removed, and a plurality of questions that are retained finally may be used as the plurality of candidate questions that are actually generated. Optionally, a regular extraction may be performed on the second output text to obtain a plurality of first questions; the plurality of first questions may be filtered based on natural semantics, so as to determine at least one second question not in line with natural semantics; and the at least one second question may be removed from the plurality of first questions, so that the plurality of candidate questions are obtained.

The method of selecting the at least one second question from the plurality of first questions is not limited here. For example, a manual selection method may be used, in which the plurality of first questions generated may be displayed to a business expert through a human-computer interaction interface, and the at least one second question may be selected from the plurality of first questions by the business expert through a mouse selection, a touch selection, etc. For another example, it is possible to use a large language model, the plurality of first questions may be input into the large language model, and the at least one second question may be selected from the plurality of first questions by using the large language model.

For example, for the three candidate questions generated in the above example, if it is determined by the business expert or the large language model that a third candidate question is not in line with natural semantics, the third candidate question may be removed, and the finally obtained two candidate questions include "what is a correlation between a purchase price indicator of material E1 and a factory price indicator of product E2" and "what is a difference between a cumulative value and a current value of a purchase price indicator of material E1."

After the plurality of candidate questions are generated, it is possible to recall, for each candidate question, a plurality of candidate indicators similar to the candidate question from the indicator database.

The method of recalling the candidate indicator is not limited here. For example, the candidate indicator may be recalled by vectorization retrieval. For another example, the candidate indicator may be recalled by keyword retrieval.

Taking the vectorization retrieval as an example, the indicator database may contain respective encoding features of the plurality of initial indicators, that is, in a process of constructing the indicator database, it is possible to process the indicator name of each initial indicator by using an encoding model to obtain the encoding feature of each initial indicator, and store the respective encoding features of the plurality of initial indicators in the indicator database.

According to embodiments of the present disclosure, recalling a plurality of candidate indicators corresponding to each candidate question from the plurality of initial indicators may include the following operations. The candidate question is encoded to obtain an encoding question feature; and the plurality of candidate indicators corresponding to the candidate question are recalled from the plurality of initial indicators based on similarity matching results between the encoding question feature and the respective encoding features of the plurality of initial indicators.

The encoding model used to encode the candidate question may be the same as the encoding model used to encode the indicator name of the initial indicator.

A similarity algorithm used to calculate a similarity between the encoding question feature and the encoding feature of the initial indicator is not limited here. For example, a cosine similarity algorithm, a Mahalanobis distance method, etc., may be used.

The similarity matching result between the encoding question feature and the encoding feature of the initial indicator may be represented by a similarity value. A plurality of initial indicators respectively corresponding to a plurality of encoding features having higher similarity values to the encoding question feature may be selected as the plurality of candidate indicators that are recalled.

Optionally, the encoding feature of the initial indicator may include a plurality of first encoding sub-features, which are obtained by encoding the initial indicator using a plurality of encoding models respectively. That is, a multi-channel vectorization may be performed on an indicator name. Accordingly, when a vectorization retrieval is performed, each channel of retrieval may be performed based on a vector similarity, and the candidate indicator finally recalled may include a recall result in each channel. Accordingly, a multi-channel vectorization encoding may be performed on each candidate question using a plurality of encoding models, that is, the encoding question feature may also include a plurality of second encoding sub-features, which are obtained by encoding the candidate question using a plurality of encoding models respectively.

According to embodiments of the present disclosure, recalling the plurality of candidate indicators corresponding to the candidate question from the plurality of initial indicators based on the similarity matching results between the encoding question feature and the respective encoding features of the plurality of initial indicators may include the following operations. A plurality of first encoding sub-features related to the second encoding sub-feature are determined from the indicator database; similarity matching is performed between the second encoding sub-feature and the plurality of first encoding sub-features related to the second encoding sub-feature respectively, so as to obtain first matching results; a plurality of candidate indicators related to the second encoding sub-feature are recalled from the plurality of initial indicators based on the plurality of first matching results; and a plurality of candidate indicators corresponding to the candidate question are obtained based on the plurality of candidate indicators respectively related to the plurality of second encoding sub-features.

The second encoding sub-feature and the plurality of first encoding sub-features related to the second encoding sub-feature may be obtained by encoding the candidate question and the respective indicator names of the plurality of initial indicators respectively using the same encoding model.

A similarity algorithm used to calculate the similarity between the second encoding sub-feature and the first encoding sub-feature is not limited here. For example, a cosine similarity algorithm, a Mahalanobis distance method, etc. may be used.

For each channel of vectorization retrieval, for example, it is possible to obtain N candidate indicators related to the second encoding sub-feature obtained by that channel of vectorization retrieval. In a case of M channels of vectorization retrieval, it is possible to finally obtain M*N candidate indicators.

Taking the keyword retrieval as an example, each candidate indicator may be split to obtain a plurality of keywords. Accordingly, the indicator name of each initial indicator in the indicator database may also contain a keyword. A matching retrieval may be performed between the keyword obtained by splitting and the respective keywords of the plurality of initial indicators, so as to recall the candidate question.

According to embodiments of the present disclosure, recalling the plurality of candidate indicators corresponding to the candidate question from the plurality of initial indicators may include the following operations. Keyword matching is performed between the candidate question and the plurality of initial indicators respectively to obtain a plurality of second matching results; and the plurality of candidate indicators corresponding to the candidate question are recalled from the plurality of initial indicators based on the plurality of second matching results.

Performing keyword matching between the candidate question and the initial indicators may include the following operations. At least one keyword is extracted from the candidate question, a similarity calculation is performed between the at least one keyword and the keyword contained in the initial indicator to obtain at least one similarity value, and the at least one similarity value is accumulated to obtain a cumulative similarity value, which may be used as the second matching result between the candidate question and the initial indicator.

It is possible to select N initial indicators corresponding to the second matching results indicating higher cumulative similarity values as candidate indicators that are recalled, which will not be described in detail here.

As an optional embodiment, the vectorization retrieval method and the keyword retrieval method may be combined for use. For example, it is possible to obtain 7*N candidate indicators through 7-channel vectorization retrieval and obtain N candidate indicators through the keyword retrieval, and 8*N candidate indicators may be recalled finally.

According to embodiments of the present disclosure, the plurality of encoding models may include Chinese encoding model, English encoding model and multilingual encoding model. Through a combination of multi-channel vectorization retrieval and keyword retrieval, information from different semantic spaces may be comprehensively utilized, which is helpful to capture a complex relationship between indicators more comprehensively, provide richer features for subsequent retrieval, and effectively improve intelligence and accuracy of retrieval.

According to embodiments of the present disclosure, for each candidate question, a plurality of initial samples corresponding to the candidate question may be generated based on the candidate question and a plurality of candidate indicators corresponding to the candidate question. The generated initial sample may be as shown in Table 1. Each row in Table 1 may be expressed as an initial sample formed by three fields, where a first field may be expressed as a candidate question, a second field may be expressed as a plurality of candidate indicators corresponding to the candidate question, and a third field may be expressed as one of the plurality of candidate indicators, which is a related indicator.

TABLE 1

| | | |
|---|---|---|
| candidate question a | candidate indicator a1, candidate indicator a2, . . . , candidate indicator an | candidate indicator a1 |
| candidate question a | candidate indicator a1, candidate indicator a2, . . . , candidate indicator an | candidate indicator a2 |
| candidate question a | candidate indicator a1, candidate indicator a2, . . . , candidate indicator an | candidate indicator a3 |

After the plurality of initial samples are constructed, each initial sample may be labeled to obtain a target sample. A process of labeling the initial sample may refer to determining whether the related indicator contained in the third field of the initial sample is the most related indicator, i.e., the target indicator. If the related indicator is the target indicator, the label of the initial sample may be determined as 1, and if the related indicator is not the target indicator, the label of the initial sample may be determined as 0.

Optionally, the process of labeling the initial sample may be performed using the large language model. For example, it is possible to label a plurality of initial samples corresponding to the candidate question by using a plurality of example samples as the basic corpus, so as to obtain a plurality of target samples corresponding to the candidate question.

Figure 4:
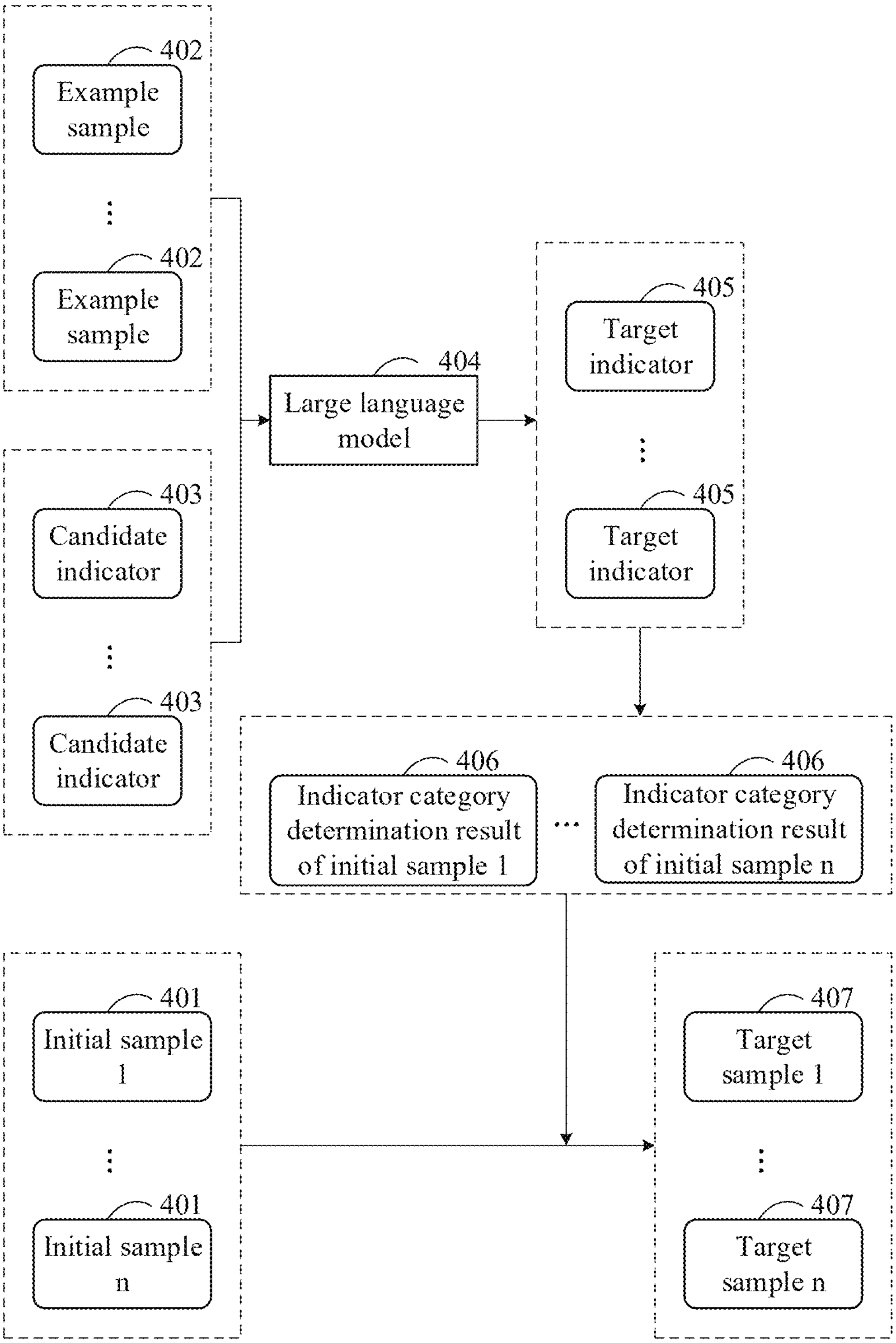
FIG. 4 schematically shows a schematic diagram of a process of labeling an initial sample according to embodiments of the present disclosure.

FIG. 4 schematically shows a schematic diagram of a process of labeling an initial sample according to embodiments of the present disclosure.

As shown in FIG. 4, for a plurality of initial sample 401 corresponding to each candidate question, a plurality of example samples 402 and a plurality of candidate indicators 403 corresponding to each candidate question may be input into a large language model 404 to output at least one target indicator 405. That is, the at least one target indicator 405 may be determined from the plurality of candidate indicators 403 corresponding to each candidate question, by using the large language model 404, with questions examples, a plurality of candidate indicator examples and target indicator examples respectively contained in the plurality of example samples 402 as the basic corpus.

According to embodiments of the present disclosure, the plurality of example samples 402 and the plurality of candidate indicators 403 may be processed into a prompt text, and the prompt text may be input into the large language model 404, so that the plurality of candidate indicators 403 may be filtered using the large language model 404. Optionally, a contextual text may be generated based on the question examples, the plurality of candidate indicator examples and the target indicator examples respectively contained in the plurality of example samples; the plurality of candidate indicators corresponding to the candidate question may be written into the first prompt template to obtain a first prompt text; the contextual text may be concatenated with the first prompt text to obtain a second prompt text; the second prompt text may be input into the large language model to obtain a first output text; and at least one target indicator may be extracted from the first output text.

The contextual text may be used to fine-tune the large language model 404 to adapt to an indicator filtering task. Optionally, the question examples, the plurality of candidate indicator examples and the target indicator examples respectively contained in the plurality of example samples may be filled into a context template to obtain the contextual text. A representation form of the context template is not limited here.

The first prompt template may include a template field and at least one replaceable field. When filling data into the first prompt template, it is possible to replace one of the at least one replaceable field by the data to be filled in. The data to be filled in may include a candidate question and a plurality of candidate indicators corresponding to the candidate question.

For example, the first prompt template may be expressed as: "[Question description] according to the question and the plurality of indicators provided, please determine which indicators may be selected to answer the question. [Request] 1. it is only needed to select indicators from the plurality of indicators provided, without outputting additional information; 2. the selected indicators should be as consistent as possible with the literal meaning of the question. Question: QUERY; candidate indicators: IND." When the data to be filled in is filled into the first prompt template, the candidate question may be filled into QUERY, and the plurality of candidate indicators corresponding to the candidate question may be filled into IND.

In the data to be filled in, the candidate question may be expressed as, for example, "what is a correlation between a purchase price indicator of material E1 and a factory price indicator of product E2." The plurality of candidate indicators may be expressed as: "purchase price indicator of material E1 (previous year=100): current value: month", "purchase price indicator of material E1 (previous year=100): cumulative value: month", "purchase price indicator of material E1 (previous year=100): current year-on-year ratio: month", "factory price indicator of product E2 (previous year=100): current value: month", "factory price indicator of product E2 (previous year=100): current year-on-year ratio: month."

After the data to be filled in is written into the first prompt template, the obtained first prompt text may be expressed as: "[Question description] according to the question and the plurality of indicators provided, please determine which indicators may selected to answer the question. [Request] 1. it is only needed to select indicators from the plurality of indicators provided, without outputting additional information; 2. the selected indicator should be as consistent as possible with the literal meaning of the question. Question: what is a correlation between a purchase price indicator of material E1 and a factory price indicator of product E2; candidate indicators: 1. purchase price indicator of material E1 (previous year=100): current value: month; 2. purchase price indicator of material E1 (previous year=100): cumulative value: month; 3. purchase price indicator of material E1 (previous year=100): current year-on-year ratio: month; 4. factory price indicator of product E2 (previous year=100): current value: month; 5. factory price indicator of product E2 (previous year=100): current year-on-year ratio: month."

The first prompt text may be input into the large language model, and the first output text output by the large language model may be expressed as: "purchase price indicator of material E1 (previous year=100): current value: month; factory price indicator of product E2 (previous year=100): current value: month." A regular extraction may be performed to extract two target indicators from the first output text, and the two target indicators may be expressed as "purchase price indicator of material E1 (previous year=100): current value: month" and "factory price indicator of product E2 (previous year=100): current value: month."

According to embodiments of the present disclosure, respective indicator categories of the plurality of candidate indicators 403 may be determined based on the at least one target indicator 405 output by the large language model 404. Accordingly, it may be determined whether the related indicator contained in each initial sample 401 is the target indicator, that is, the indicator category of the related indicator may be determined. The indicator category of the related indicator contained in each initial sample 401 may be represented by an indicator category determination result 406 of the initial sample. The plurality of initial samples 406 may be labeled based on the indicator category determination result 406 of each initial sample, so as to obtain a plurality of target samples 407.

According to embodiments of the present disclosure, labeling the plurality of initial samples based on the respective indicator category determination results of the plurality of initial samples to obtain a plurality of target samples may include the following operations. If the indicator category determination result of the initial sample indicates that the candidate indicator in the initial sample is the target indicator, the label of the initial sample is determined as a positive sample label; if the indicator category determination result of the initial sample indicates that the candidate indicator in the initial sample is not the target indicator, the label of the initial sample is determined as a negative sample label; and a plurality of target samples are obtained based on the plurality of initial samples and the respective labels of the plurality of initial samples.

The positive sample label may be denoted as 1, and the negative sample label may be denoted as 0. 1 may indicate high correlation, and 0 may indicate non-correlation or weak correlation.

According to embodiments of the present disclosure, by generating the sample based on the example sample using the large language model, it is possible to more deeply understand a user query intention, so as to simulate a user query and generate a large amount of sample data, which may effectively improve diversity of data, help to capture user needs more accurately, and effectively reduce the dependence on manual labeling and the costs of sample generation.

Figure 5:
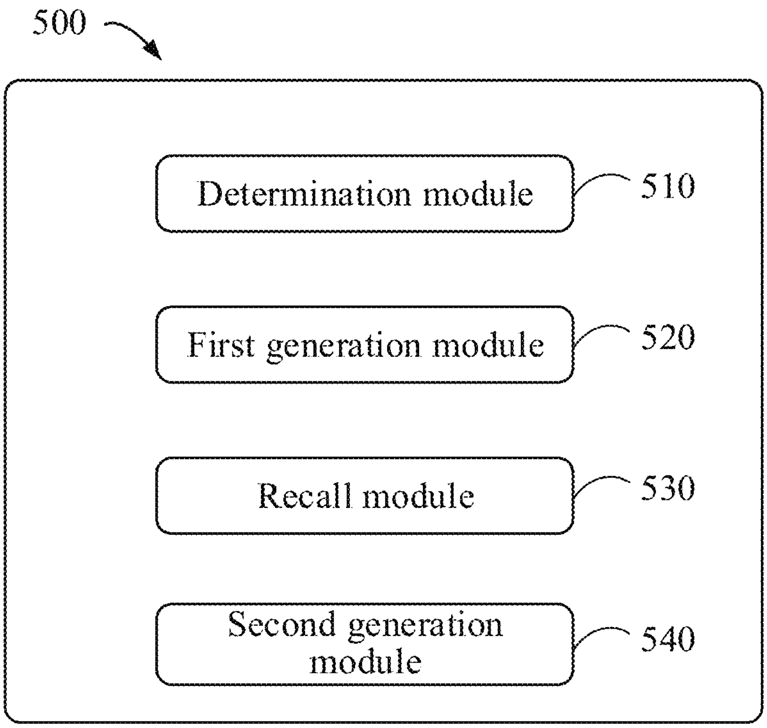
FIG. 5 schematically shows a block diagram of a large model-based apparatus of generating a sample according to embodiments of the present disclosure.

FIG. 5 schematically shows a block diagram of a large model-based apparatus of generating a sample according to embodiments of the present disclosure.

As shown in FIG. 5, a large model-based apparatus 500 of generating a sample may include a determination module 510, a first generation module 520, a recall module 530, and a second generation module 540.

The determination module 510 may be used to determine a plurality of indicators from a plurality of initial indicators contained in an indicator database in response to a sample generation request, where the sample generation request contains an example sample.

The first generation module 520 may be used to generate a plurality of candidate questions based on the plurality of indicators by using a question example contained in the example sample as a basic corpus.

The recall module 530 may be used to recall a plurality of candidate indicators corresponding to the candidate question from the plurality of initial indicators.

The second generation module 540 may be used to generate a plurality of target samples based on the plurality of candidate questions and the plurality of candidate indicators corresponding to the candidate question by using a plurality of example samples as the basic corpus.

According to embodiments of the present disclosure, the second generation module 540 includes a first generation sub-module and a second generation sub-module.

The first generation sub-module may be used to generate a plurality of initial samples corresponding to the candidate question based on the candidate question and the plurality of candidate indicators corresponding to the candidate question, where the initial sample includes the candidate question, the plurality of candidate indicators corresponding to the candidate question and a related indicator corresponding to the candidate question, and the related indicator belongs to the plurality of candidate indicators corresponding to the candidate question.

The second generation sub-module may be used to label the plurality of initial samples corresponding to the candidate question by using the plurality of example samples as the basic corpus, so as to obtain the plurality of target samples corresponding to the candidate question.

According to embodiments of the present disclosure, the second generation sub-module includes a first generation unit and a second generation unit.

The first generation unit may be used to determine at least one target indicator from the plurality of candidate indicators corresponding to the candidate question by using question examples, a plurality of candidate indicator examples and target indicator examples respectively contained in the plurality of example samples as the basic corpus.

The second generation unit may be used to label the plurality of initial samples based on respective indicator category determination results of the plurality of initial samples, so as to obtain the plurality of target samples, where the indicator category determination result indicates whether the related indicator in the initial sample is the target indicator.

According to embodiments of the present disclosure, the first generation unit includes a first generation sub-unit, a second generation sub-unit, a third generation sub-unit, a fourth generation sub-unit, and a fifth generation sub-unit.

The first generation sub-unit may be used to generate a contextual text based on the question examples, the plurality of candidate indicator examples and the target indicator examples respectively contained in the plurality of example samples.

The second generation sub-unit may be used to write a plurality of candidate indicators corresponding to the candidate question into a first prompt template to obtain a first prompt text.

The third generation sub-unit may be used to concatenate the contextual text with the first prompt text to obtain a second prompt text.

The fourth generation sub-unit may be used to input the second prompt text into a large language model to obtain a first output text.

The fifth generation sub-unit may be used to extract the at least one target indicator from the first output text.

According to embodiments of the present disclosure, the second generation unit includes a sixth generation sub-unit, a seventh generation sub-unit, and an eighth generation sub-unit.

The sixth generation sub-unit may be used to determine a label of the initial sample as a positive sample label in response to the indicator category determination result of the initial sample indicating that the related indicator in the initial sample is the target indicator.

The seventh generation sub-unit may be used to determine the label of the initial sample as a negative sample label in response to the indicator category determination result of the initial sample indicating that the related indicator in the initial sample is not the target indicator.

The eighth generation sub-unit may be used to obtain the plurality of target samples based on the plurality of initial samples and the respective labels of the plurality of initial samples.

According to embodiments of the present disclosure, the first generation module 520 includes a third generation sub-module, a fourth generation sub-module, and a fifth generation sub-module.

The third generation sub-module may be used to write the question example and the plurality of indicators respectively into a second prompt template to obtain a third prompt text.

The fourth generation sub-module may be used to input the third prompt text into a large language model to obtain a second output text.

The fifth generation sub-module may be used to extract the plurality of candidate questions from the second output text.

According to embodiments of the present disclosure, the fifth generation sub-module includes a third generation unit, a fourth generation unit, and a fifth generation unit.

The third generation unit may be used to perform a regular extraction on the second output text to obtain a plurality of first questions.

The fourth generation unit may be used to filter the plurality of first questions based on natural semantics, so as to determine at least one second question not in line with the natural semantics.

The fifth generation unit may be used to remove the at least one second question from the plurality of first questions to obtain the plurality of candidate questions.

According to embodiments of the present disclosure, the indicator database contains respective encoding features of the plurality of initial indicators.

According to embodiments of the present disclosure, the recall module 530 includes a first recall sub-module and a second recall sub-module.

The first recall sub-module may be used to encode the candidate question to obtain an encoding question feature.

The second recall sub-module may be used to recall the plurality of candidate indicators corresponding to the candidate question from the plurality of initial indicators based on similarity matching results between the encoding question feature and the respective encoding features of the plurality of initial indicators.

According to embodiments of the present disclosure, the encoding feature of the initial indicator includes a plurality of first encoding sub-features obtained by encoding the initial indicator using a plurality of encoding models respectively, and the encoding question feature includes a plurality of second encoding sub-features obtained by encoding the candidate question using the plurality of encoding models respectively.

According to embodiments of the present disclosure, the second recall sub-module includes a first recall unit, a second recall unit, a third recall unit, and a fourth recall unit.

The first recall unit may be used to determine a plurality of first encoding sub-features related to the second encoding sub-feature from the indicator database.

The second recall unit may be used to perform similarity matching between the second encoding sub-feature and the plurality of first encoding sub-features related to the second encoding sub-feature respectively, so as to obtain a plurality of first matching results.

The third recall unit may be used to recall a plurality of candidate indicators related to the second encoding sub-feature from the plurality of initial indicators based on the plurality of first matching results.

The fourth recall unit may be used to obtain the plurality of candidate indicators corresponding to the candidate question based on a plurality of candidate indicators respectively related to the plurality of second encoding sub-features.

According to embodiments of the present disclosure, the recall module 530 includes a third recall sub-module and a fourth recall sub-module.

The third recall sub-module may be used to perform keyword matching between the candidate question and the plurality of initial indicators respectively, so as to obtain a plurality of second matching results.

The fourth recall sub-module may be used to recall the plurality of candidate indicators corresponding to the candidate question from the plurality of initial indicators based on the plurality of second matching results.

According to embodiments of the present disclosure, the initial indicator is a statistical indicator of business data; the business data includes at least one of financial data or economic data; and the statistical indicator includes at least one of a current value, a cumulative value, a year-on-year ratio, a month-on-month ratio, or a growth rate.

Figure 6:
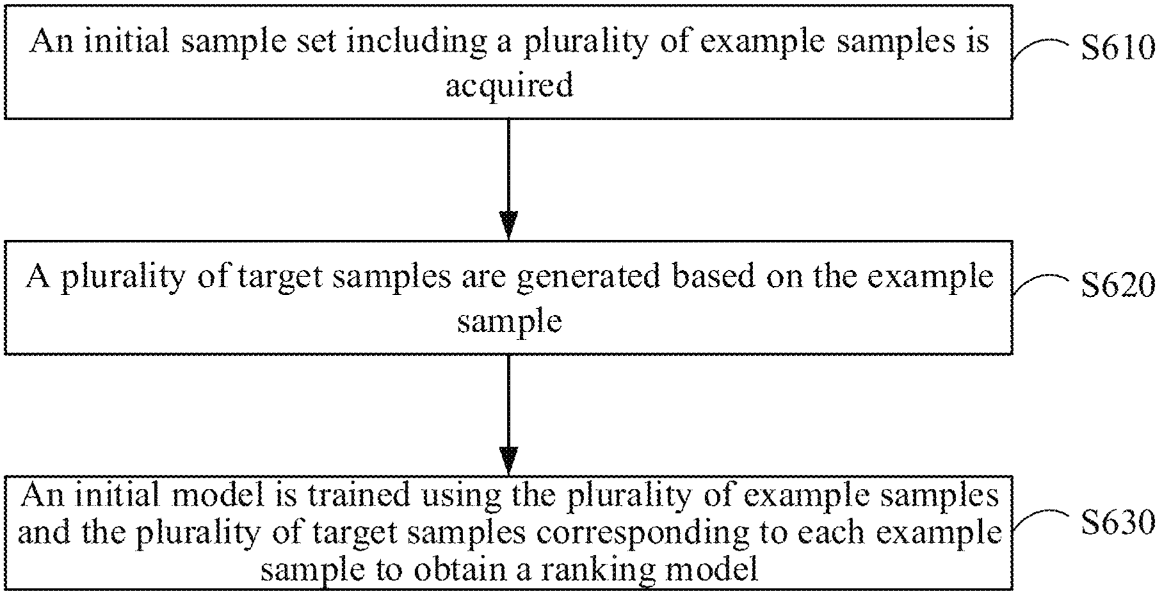
FIG. 6 schematically shows a schematic diagram of a method of training a model according to embodiments of the present disclosure.

FIG. 6 schematically shows a schematic diagram of a method of training a model according to embodiments of the present disclosure.

As shown in FIG. 6, the method includes operation S610 to operation S630.

In operation S610, an initial sample set including a plurality of example samples is acquired.

In operation S620, a plurality of target samples are generated based on the example sample.

In operation S630, an initial model is trained using the plurality of example samples and the plurality of target samples corresponding to each example sample to obtain a ranking model.

According to embodiments of the present disclosure, the plurality of target samples corresponding to each example sample are generated based on each example sample by using the large model-based method of generating the sample as described above, which will not be repeated here.

The ranking model may be used to rank retrieved indicators in order of relevance.

According to embodiments of the present disclosure, the ranking module trained by a large number of constructed positive and negative samples may have stronger intelligence and adaptive ability.

Figure 7:
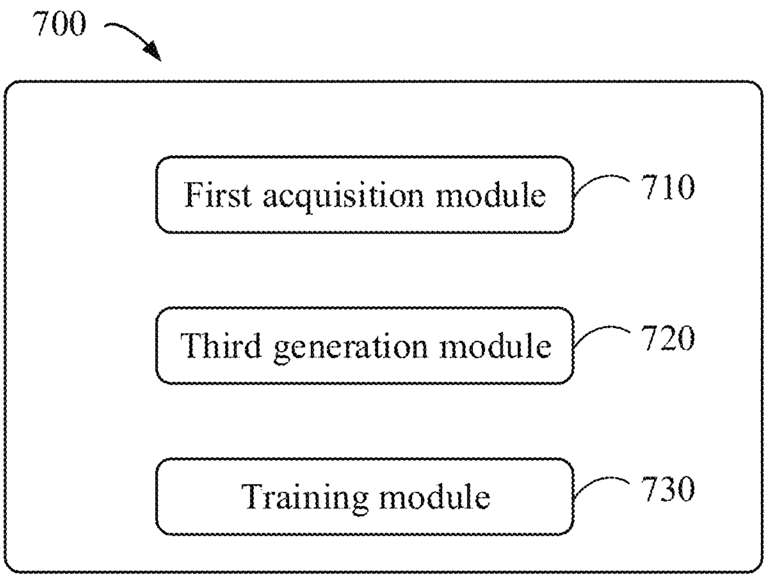
FIG. 7 schematically shows a block diagram of an apparatus of training a model according to embodiments of the present disclosure.

FIG. 7 schematically shows a block diagram of an apparatus of training a model according to embodiments of the present disclosure.

As shown in FIG. 7, an apparatus 700 of training a model may include a first acquisition module 710, a third generation module 720, and a training module 730.

The first acquisition module 710 may be used to acquire an initial sample set including a plurality of example samples.

The third generation module 720 may be used to generate a plurality of target samples based on the example sample.

The training module 730 may be used to train an initial model using the plurality of example samples and the plurality of target samples corresponding to each example sample to obtain a ranking model.

According to embodiments of the present disclosure, the plurality of target samples corresponding to each example sample are generated based on each example sample by using the large model-based method of generating the sample as described above, which will not be repeated here.

Figure 8:
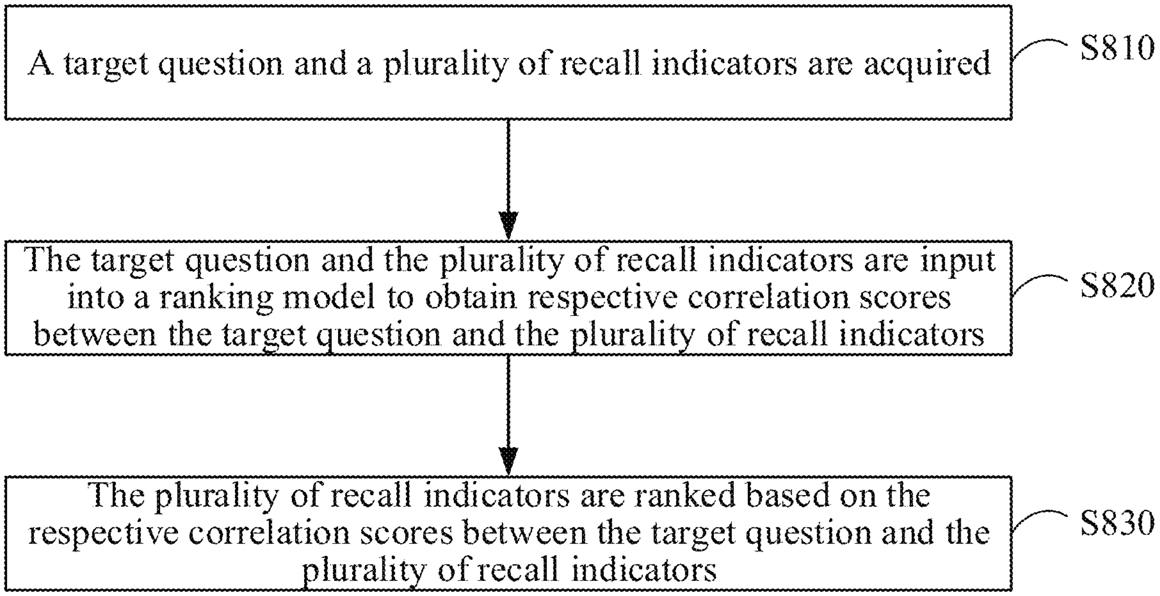
FIG. 8 schematically shows a schematic diagram of a ranking method according to embodiments of the present disclosure.

FIG. 8 schematically shows a schematic diagram of a ranking method according to embodiments of the present disclosure.

As shown in FIG. 8, the method includes operation S810 to operation S830.

In operation S810, a target question and a plurality of recall indicators are acquired.

In operation S820, the target question and the plurality of recall indicators are input into a ranking model to obtain respective correlation scores between the target question and the plurality of recall indicators.

In operation S830, the plurality of recall indicators are ranked based on the respective correlation scores between the target question and the plurality of recall indicators.

According to embodiments of the present disclosure, the ranking model may be trained by using the method of training the model as described above, which will not be repeated here.

According to embodiments of the present disclosure, a large number of target samples may be generated based on a small number of example samples by using a large language model, and a ranking model may be trained by using the example samples and the target samples. When the ranking model is used for retrieval, the ranking model may capture user needs more accurately, so that an output retrieval result is more in line with the user query intention, and a ranking accuracy of the sorting model may be improved.

Figure 9:
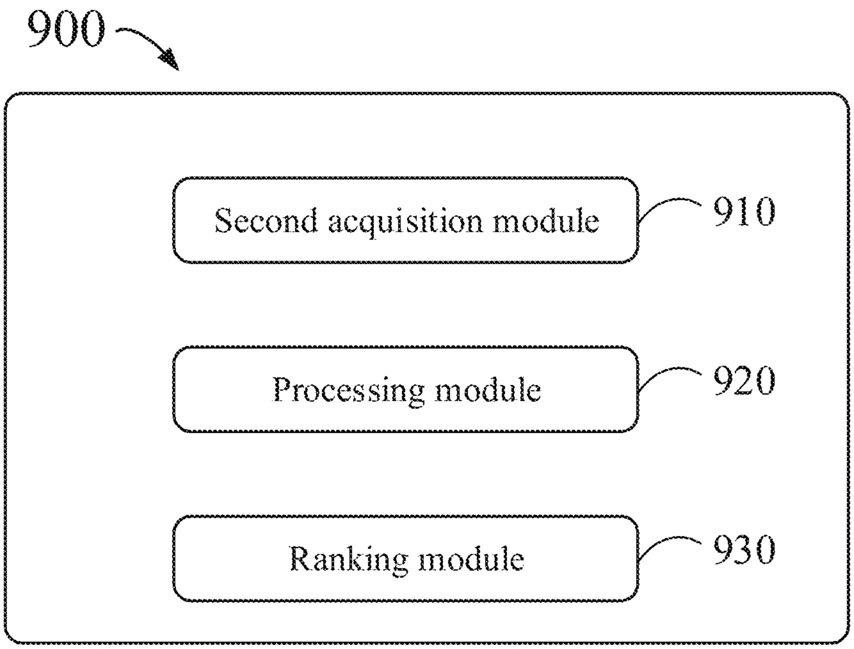
FIG. 9 schematically shows a block diagram of a ranking apparatus according to embodiments of the present disclosure.

FIG. 9 schematically shows a block diagram of a ranking apparatus according to embodiments of the present disclosure.

As shown in FIG. 9, a ranking apparatus 900 may include a second acquisition module 910, a processing module 920, and a ranking module 930.

The second acquisition module 910 may be used to acquire a target question and a plurality of recall indicators.

The processing module 920 may be used to input the target question and the plurality of recall indicators into a ranking model to obtain respective correlation scores between the target question and the plurality of recall indicators.

The ranking module 930 may be used to rank the plurality of recall indicators based on the respective correlation scores between the target question and the plurality of recall indicators.

According to embodiments of the present disclosure, the ranking model may be trained by using the method of training the model as described above, which will not be repeated here.

According to embodiments of the present disclosure, the present disclosure further provides an electronic device, a readable storage medium, and a computer program product.

According to embodiments of the present disclosure, an electronic device is provided, including: at least one processor; and a memory communicatively connected to the at least one processor. The memory stores instructions executable by the at least one processor, and the instructions are used to, when executed by the at least one processor, cause the at least one processor to implement the methods described above.

According to embodiments of the present disclosure, a non-transitory computer-readable storage medium having computer instructions therein is provided, and the computer instructions are used to cause a computer to implement the methods described above.

According to embodiments of the present disclosure, a computer program product containing a computer program is provided, and the computer program is used to, when executed by a processor, cause the processor to implement the methods described above.

Figure 10:
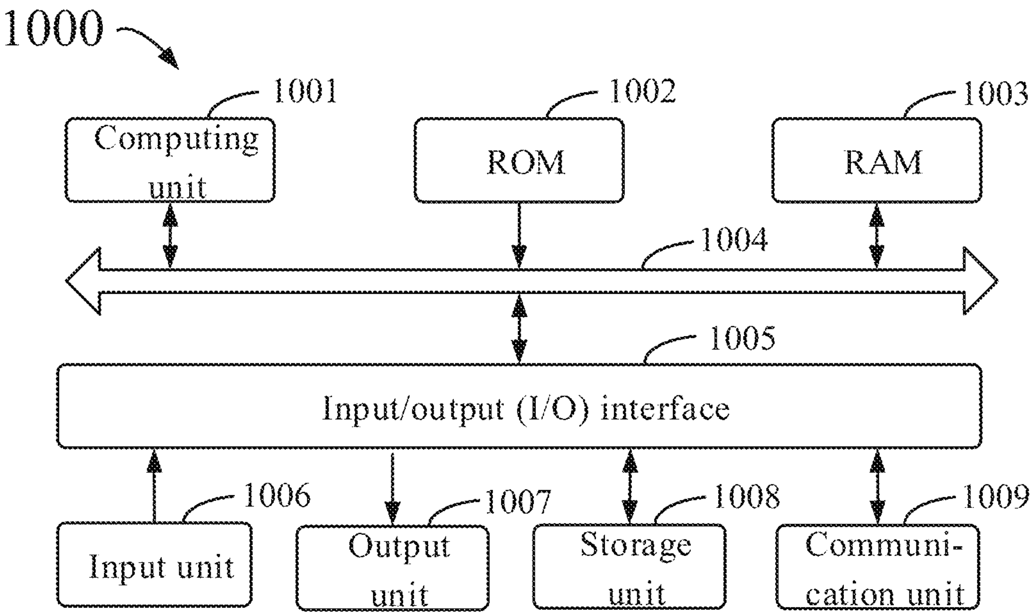
FIG. 10 shows a schematic block diagram of an example electronic device that may be used to implement embodiments of the present disclosure.

FIG. 10 schematically shows a schematic block diagram of an example electronic device that may be used to implement embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 10, the electronic device 1000 includes a computing unit 1001 which may perform various appropriate actions and processes according to a computer program stored in a read only memory (ROM) 1002 or a computer program loaded from a storage unit 1008 into a random access memory (RAM) 1003. In the RAM 1003, various programs and data necessary for an operation of the electronic device 1000 may also be stored. The computing unit 1001, the ROM 1002 and the RAM 1003 are connected to each other through a bus 1004. An input/output (I/O) interface 1005 is also connected to the bus 1004.

A plurality of components in the electronic device 1000 are connected to the I/O interface 1005, including: an input unit 1006, such as a keyboard, or a mouse; an output unit 1007, such as displays or speakers of various types; a storage unit 1008, such as a disk, or an optical disc; and a communication unit 1009, such as a network card, a modem, or a wireless communication transceiver. The communication unit 1009 allows the electronic device 1000 to exchange information/data with other devices through a computer network such as Internet and/or various telecommunication networks.

The computing unit 1001 may be various general-purpose and/or dedicated processing assemblies having processing and computing capabilities. Some examples of the computing unit 1001 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 1001 executes various methods and processes described above, such as the large model-based method of generating the sample, the method of training the model, and the ranking method. For example, in some embodiments, the large model-based method of generating the sample, the method of training the model, and the ranking method may be implemented as a computer software program which is tangibly embodied in a machine-readable medium, such as the storage unit 1008. In some embodiments, the computer program may be partially or entirely loaded and/or installed in the electronic device 1000 via the ROM 1002 and/or the communication unit 1009. The computer program, when loaded in the RAM 1003 and executed by the computing unit 1001, may execute one or more steps in the large model-based method of generating the sample, the method of training the model, and the ranking method described above. Alternatively, in other embodiments, the computing unit 1001 may be used to perform the large model-based method of generating the sample, the method of training the model, and the ranking method by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, speech input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. A relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A large model-based method of generating a sample, the method comprising:

determining a plurality of indicators from a plurality of initial indicators contained in an indicator database in response to a sample generation request, wherein the sample generation request contains an example sample;

generating a plurality of candidate questions based on the plurality of indicators by using a question example contained in the example sample as a basic corpus;

recalling a plurality of candidate indicators corresponding to each candidate question from the plurality of initial indicators; and generating a plurality of target samples based on the plurality of candidate questions and the plurality of candidate indicators corresponding to each candidate question by using a plurality of example samples as the basic corpus, wherein the generating the plurality of target samples comprises:

generating a plurality of initial samples corresponding to each candidate question based on each candidate question and the plurality of candidate indicators corresponding to each candidate question, wherein each initial sample comprises a candidate question, a plurality of candidate indicators corresponding to the candidate question and a related indicator corresponding to the candidate question, and the related indicator belongs to the plurality of candidate indicators corresponding to the candidate question; and labeling the plurality of initial samples corresponding to each candidate question by using the plurality of example samples as the basic corpus, so as to obtain the plurality of target samples corresponding to each candidate question.

2. The method of claim 1, wherein the labeling the plurality of initial samples corresponding to each candidate question by using the plurality of example samples as the basic corpus so as to obtain the plurality of target samples corresponding to each candidate question comprises:

determining at least one target indicator from the plurality of candidate indicators corresponding to each candidate question by using question examples, a plurality of candidate indicator examples and target indicator examples respectively contained in the plurality of example samples as the basic corpus; and labeling the plurality of initial samples based on respective indicator category determination results of the plurality of initial samples, so as to obtain the plurality of target samples, wherein the indicator category determination results indicate whether the related indicator in each initial sample is a target indicator.

3. The method of claim 2, wherein the determining at least one target indicator from the plurality of candidate indicators corresponding to each candidate question by using question examples, a plurality of candidate indicator examples and target indicator examples respectively contained in the plurality of example samples as the basic corpus comprises:

generating a contextual text based on the question examples, the plurality of candidate indicator examples and the target indicator examples respectively contained in the plurality of example samples;

writing the plurality of candidate indicators corresponding to each candidate question into a first prompt template to obtain a first prompt text;

concatenating the contextual text with the first prompt text to obtain a second prompt text;

inputting the second prompt text into a large language model to obtain a first output text; and extracting the at least one target indicator from the first output text.

4. The method of claim 2, wherein the labeling the plurality of initial samples based on respective indicator category determination results of the plurality of initial samples so as to obtain the plurality of target samples comprises:

determining a label of an initial sample as a positive sample label in response to an indicator category determination result of the initial sample indicating that the related indicator in the initial sample is the target indicator;

determining the label of the initial sample as a negative sample label in response to the indicator category determination result of the initial sample indicating that the related indicator in the initial sample is not the target indicator; and obtaining the plurality of target samples based on the plurality of initial samples and respective labels of the plurality of initial samples.

5. The method of claim 1, wherein the generating a plurality of candidate questions based on the plurality of indicators by using a question example contained in the example sample as a basic corpus comprises:

writing the question example and the plurality of indicators respectively into a second prompt template to obtain a third prompt text;

inputting the third prompt text into a large language model to obtain a second output text; and extracting the plurality of candidate questions from the second output text.

6. The method of claim 5, wherein the extracting the plurality of candidate questions from the second output text comprises:

performing a regular extraction on the second output text to obtain a plurality of first questions;

filtering the plurality of first questions based on natural semantics, so as to determine at least one second question not in line with the natural semantics; and removing the at least one second question from the plurality of first questions to obtain the plurality of candidate questions.

7. The method of claim 1, wherein the indicator database contains respective encoding features of the plurality of initial indicators; and wherein the recalling a plurality of candidate indicators corresponding to each candidate question from the plurality of initial indicators comprises:

encoding each candidate question to obtain an encoding question feature; and recalling the plurality of candidate indicators corresponding to each candidate question from the plurality of initial indicators based on similarity matching results between the encoding question feature and the respective encoding features of the plurality of initial indicators.

8. The method of claim 7, wherein an encoding feature of an initial indicator comprises a plurality of first encoding sub-features obtained by encoding the initial indicator using a plurality of encoding models respectively, and the encoding question feature comprises a plurality of second encoding sub-features obtained by encoding each candidate question using the plurality of encoding models respectively;

wherein the recalling the plurality of candidate indicators corresponding to each candidate question from the plurality of initial indicators based on similarity matching results between the encoding question feature and the respective encoding features of the plurality of initial indicators comprises:

determining a plurality of first encoding sub-features related to a second encoding sub-feature from the indicator database;

performing similarity matching between the second encoding sub-feature and the plurality of first encoding sub-features related to the second encoding sub-feature respectively, so as to obtain a plurality of first matching results;

recalling a plurality of candidate indicators related to the second encoding sub-feature from the plurality of initial indicators based on the plurality of first matching results; and obtaining the plurality of candidate indicators corresponding to each candidate question based on a plurality of candidate indicators respectively related to the plurality of second encoding sub-features.

9. The method of claim 1, wherein the recalling a plurality of candidate indicators corresponding to each candidate question from the plurality of initial indicators comprises:

performing keyword matching between each candidate question and the plurality of initial indicators respectively, so as to obtain a plurality of second matching results; and recalling the plurality of candidate indicators corresponding to each candidate question from the plurality of initial indicators based on the plurality of second matching results.

10. The method of claim 1, wherein the initial indicator is a statistical indicator of business data;

the business data comprises at least one of financial data or economic data; and the statistical indicator comprises at least one of a current value, a cumulative value, a year-on-year ratio, a month-on-month ratio, or a growth rate.

11. A method of training a model, the method comprising:

acquiring an initial sample set comprising a plurality of example samples;

generating a plurality of target samples based on the plurality of example samples; and training an initial model by using the plurality of example samples and the plurality of target samples corresponding to the plurality of example samples, so as to obtain a ranking model, wherein the plurality of target samples corresponding to the plurality of example samples are generated based on the plurality of example samples by using the large model-based method of generating the sample of claim 1.

12. A ranking method comprising:

acquiring a target question and a plurality of recall indicators;

inputting the target question and the plurality of recall indicators into a ranking model to obtain respective correlation scores between the target question and the plurality of recall indicators; and ranking the plurality of recall indicators based on the respective correlation scores between the target question and the plurality of recall indicators, wherein the ranking model is trained by using the method of training the model of claim 11.

13. An electronic device, comprising:

at least one processor; and a memory communicatively connected to the at least one processor, wherein the memory stores instructions executable by the at least one processor, and the instructions are configured to, when executed by the at least one processor, cause the at least one processor to:

determine a plurality of indicators from a plurality of initial indicators contained in an indicator database in response to a sample generation request, wherein the sample generation request contains an example sample;

generate a plurality of candidate questions based on the plurality of indicators by using a question example contained in the example sample as a basic corpus;

recall a plurality of candidate indicators corresponding to each candidate question from the plurality of initial indicators; and generate a plurality of target samples based on the plurality of candidate questions and the plurality of candidate indicators corresponding to each candidate question by using a plurality of example samples as the basic corpus, wherein the generation of the plurality of target samples comprises:

generation of a plurality of initial samples corresponding to each candidate question based on each candidate question and the plurality of candidate indicators corresponding to each candidate question, wherein each initial sample comprises a candidate question, a plurality of candidate indicators corresponding to the candidate question and a related indicator corresponding to the candidate question, and the related indicator belongs to the plurality of candidate indicators corresponding to the candidate question; and labelling of the plurality of initial samples corresponding to each candidate question by using the plurality of example samples as the basic corpus, so as to obtain the plurality of target samples corresponding to each candidate question.

14. An electronic device, comprising:

at least one processor; and a memory communicatively connected to the at least one processor, wherein the memory stores instructions executable by the at least one processor, and the instructions are configured to, when executed by the at least one processor, cause the at least one processor to implement the method of claim 11.

15. An electronic device, comprising:

at least one processor; and a memory communicatively connected to the at least one processor, wherein the memory stores instructions executable by the at least one processor, and the instructions are configured to, when executed by the at least one processor, cause the at least one processor to implement the method of claim 12.

16. A non-transitory computer-readable storage medium having computer instructions therein, wherein the computer instructions are configured to cause a computer system to at least:

determine a plurality of indicators from a plurality of initial indicators contained in an indicator database in response to a sample generation request, wherein the sample generation request contains an example sample;

generate a plurality of candidate questions based on the plurality of indicators by using a question example contained in the example sample as a basic corpus;

recall a plurality of candidate indicators corresponding to each candidate question from the plurality of initial indicators; and generate a plurality of target samples based on the plurality of candidate questions and the plurality of candidate indicators corresponding to each candidate question by using a plurality of example samples as the basic corpus, wherein the generation of the plurality of target samples comprises:

generation of a plurality of initial samples corresponding to each candidate question based on each candidate question and the plurality of candidate indicators corresponding to each candidate question, wherein each initial sample comprises a candidate question, a plurality of candidate indicators corresponding to the candidate question and a related indicator corresponding to the candidate question, and the related indicator belongs to the plurality of candidate indicators corresponding to the candidate question; and labelling of the plurality of initial samples corresponding to each candidate question by using the plurality of example samples as the basic corpus, so as to obtain the plurality of target samples corresponding to each candidate question.

17. A non-transitory computer-readable storage medium having computer instructions therein, wherein the computer instructions are configured to cause a computer system to implement at least the method of claim 11.

18. A non-transitory computer-readable storage medium having computer instructions therein, wherein the computer instructions are configured to cause a computer system to implement at least the method of claim 12.

* * * * *